(12) United States Patent
Ikeguchi (10) Patent No.: US 8,330,929 B2
(45) Date of Patent: Dec. 11, 2012

(54) DISPLAY PANEL

(75) Inventor: Tazo Ikeguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 467 days.

(21) Appl. No.: 12/748,070

(22) Filed: Mar. 26, 2010

(65) Prior Publication Data
US 2011/0234966 A1   Sep. 29, 2011

(51) Int. Cl.
*G02F 1/1339* (2006.01)

(52) U.S. Cl. ........................................................ 349/153

(58) Field of Classification Search .................. 349/153, 349/154, 156–159
See application file for complete search history.

(56) References Cited

U.S. PATENT DOCUMENTS

| | | | | |
|---|---|---|---|---|
| 3,990,782 | A * | 11/1976 | Yamasaki | 349/154 |
| 5,477,361 | A * | 12/1995 | Yanagi | 349/153 |
| 5,801,797 | A * | 9/1998 | Iida et al. | 349/73 |
| 6,515,721 | B2 * | 2/2003 | Jin et al. | 349/58 |
| 7,859,635 | B2 * | 12/2010 | Yokoyama et al. | 349/155 |
| 8,120,743 | B2 * | 2/2012 | Katsumura et al. | 349/153 |
| 8,120,744 | B2 * | 2/2012 | Yoshino et al. | 349/153 |
| 2007/0103634 | A1 * | 5/2007 | Kim et al. | 349/154 |
| 2007/0263159 | A1 * | 11/2007 | Kobayashi et al. | 349/153 |
| 2010/0045922 | A1 * | 2/2010 | Motomatsu | 349/156 |

FOREIGN PATENT DOCUMENTS

| | | |
|---|---|---|
| JP | 10-142597 A | 5/1998 |
| JP | 11-44869 A | 2/1999 |
| JP | 2002-72904 A | 3/2002 |
| JP | 2003-223111 A | 8/2003 |
| JP | 2008-46446 A | 2/2008 |
| JP | 2008-225398 A | 9/2008 |

* cited by examiner

*Primary Examiner* — Akm Ullah (74) *Attorney, Agent, or Firm* — Birch, Stewart, Kolasch & Birch, LLP (57) ABSTRACT

A display panel includes a first substrate in which a terminal area is defined along at least one edge thereof, and connection terminals are formed in the terminal area; and a second substrate which is bonded to the first substrate with sealing material being interposed between the first and second substrates, so as to expose the connection terminals. At an edge of the second substrate corresponding to the edge of the first substrate, at which the terminal area is defined, the second substrate includes protrusions protruding to the edge of the first substrate.

8 Claims, 5 Drawing Sheets

DISPLAY PANEL

CROSS-REFERENCE TO RELATED APPLICATION

This application relates to Japanese Patent Application No. 2007-265129 filed on Oct. 11, 2007, the disclosure of which including the specification, the drawings, and the claims is hereby incorporated by reference in its entirety.

BACKGROUND

The present disclosure relates to a display panel, and particularly relates to a display panel manufactured by boding a pair of glass substrates together.

Liquid crystal display panels are display panels having various characteristics such as thin profile, light weight, and low power consumption, and have been widely used for liquid crystal televisions, mobile phones, etc.

Figure 8:
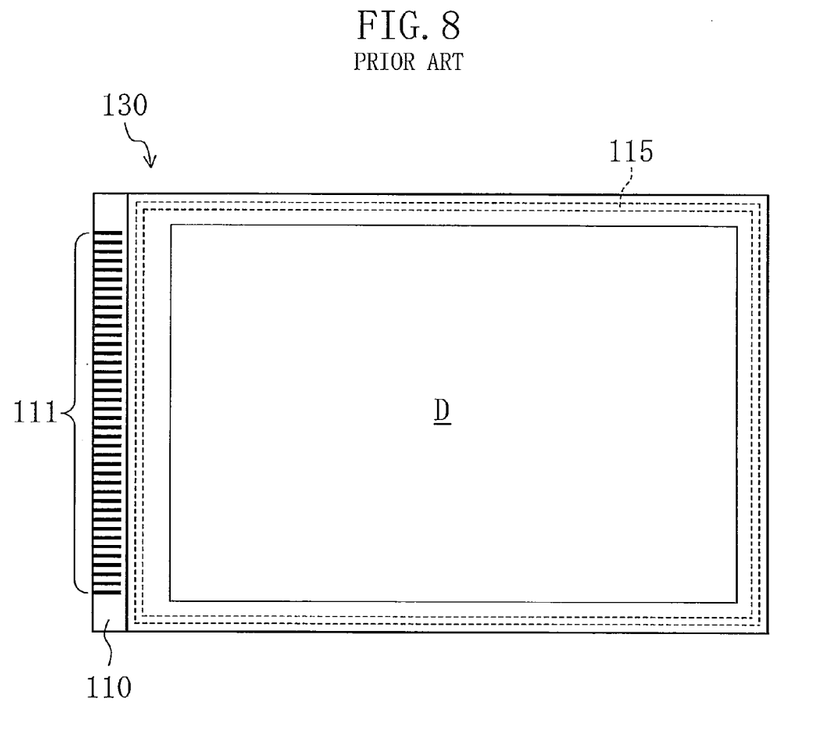
FIG. 8 is a plan view of a conventional liquid crystal display panel.
Figure 9:
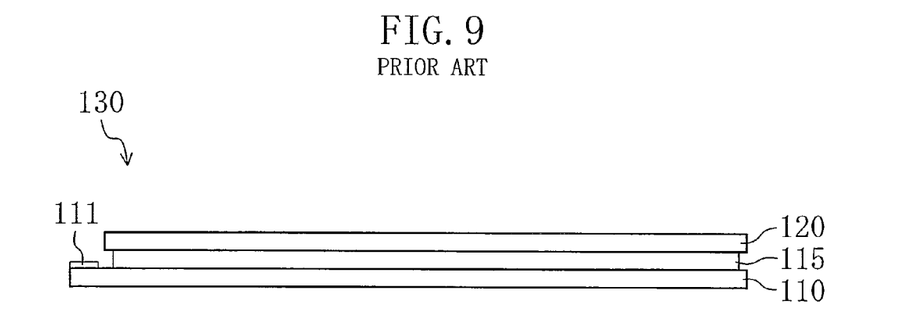
FIG. 9 is a side view of the liquid crystal display panel.

FIG. 8 is a plan view of a conventional liquid crystal display panel 130, and FIG. 9 is a side view thereof.

As illustrated in FIGS. 8 and 9, the liquid crystal display panel 130 includes a TFT substrate 110 on which thin-film transistors (hereinafter referred to as "TFTs"), etc. are formed; a color filter substrate 120 arranged so as to oppose the TFT substrate 110; a liquid crystal layer (not shown in the figure) provided between the both substrates 110 and 120; and a sealing material 115 for bonding the both substrates 110 and 120 together, and for sealing the liquid crystal layer.

As illustrated in FIGS. 8 and 9, an area of the TFT substrate 110, which exposes outside the color filter substrate 120, is a terminal area in which a plurality of connection terminals 111 for inputting a display signal to a display area D are provided.

Recently, since the thickness of liquid crystal panels themselves has been reduced, the thickness of the TFT substrate 110 is increasingly reduced. As illustrated in FIGS. 8 and 9, the terminal area is the area of the TFT substrate 110, which does not overlap with the color filter substrate 120, i.e., is constituted by a single glass substrate. Thus, the substrate in the terminal area may be damaged due to external impact or its own deflection.

For example, Japanese Patent Publication No. 11-44869 discloses a method for preparing a liquid crystal (display) panel in which sealing material and a pair of substrates are simultaneously cut with the sealing material being interposed between the substrates. Japanese Patent Publication No. 11-44869 also describes that, according to such a method, a strong liquid crystal (display) panel, a yield rate of which is improved, and which has a good cutting surface, can be prepared as compared to the conventional liquid crystal (display) panel.

In the preparation method disclosed in Japanese Patent Publication No. 11-44869, since the good cutting surface where the cutting surfaces of the substrates and of the sealing material coincide with each other is formed, the strong liquid crystal display panel can be prepared. However, the damage in the terminal area T is not considered, and room for improvement remains.

The present disclosure has been made in view of the foregoing, and it is an object of the present disclosure to reduce damage in a terminal area of a display panel.

SUMMARY

In order to achieve such an object, the display panel of the present disclosure includes protrusions protruding to an edge of a first substrate, at which a terminal area is defined, at an edge of a second substrate corresponding to such an edge of the first substrate.

Specifically, the display panel of the present disclosure includes a first substrate in which a terminal area is defined along at least one edge thereof, and connection terminals are formed in the terminal area; and a second substrate which is bonded to the first substrate with sealing material being interposed between the first and second substrates, so as to expose the connection terminals. At an edge of the second substrate corresponding to the edge of the first substrate, at which the terminal area is defined, the second substrate includes protrusions protruding to the edge of the first substrate.

According to the above-described structure, the terminal area including the connection terminals is defined along at least one edge of the first substrate. The second substrate is bonded to the first substrate with the sealing material being interposed therebetween. At the edge of the second substrate corresponding to the edge of the first substrate, at which the terminal area is defined, the second substrate includes the protrusions protruding to such an edge of the first substrate. Thus, the protrusions which are a part of the second substrate overlap with the terminal area of the first substrate. This improves strength of the terminal area in the display panel as compared to strength if the terminal area is constituted by only the first substrate, thereby reducing damage in the terminal area of the display panel.

The sealing material may be applied in a frame-like shape, and a liquid crystal layer sealed by the sealing material may be provided between the first and second substrates.

According to the above-described structure, the liquid crystal layer is sealed by the frame-shaped sealing material between the first and second substrates, thereby implementing a liquid crystal display panel.

The protrusions may be provided in both end portions of the second substrate at the edge corresponding to the edge of the first substrate, at which the terminal area is defined.

According to the above-described structure, the protrusions are arranged in the both end portions of the second substrate at the edge corresponding to the edge of the first substrate, at which the terminal area is defined. Thus, the protrusions of the second substrate are arranged so as to overlap with both end portions of the terminal area of the first substrate. Because the damage in the terminal area of the display panel tends to be caused in the end portions of the terminal area, the protrusions of the second substrate are arranged so as to overlap with the both end portions of the terminal area of the first substrate, thereby effectively reducing the damage in the terminal area of the display panel.

The sealing material may be applied in the frame-like shape, and sealing extension portions extending from corners of the sealing material may be provided between the first substrate and the protrusions of the second substrate.

According to the above-described structure, the sealing extension portions for bonding the first substrate to the protrusions of the second substrate are portions extending from the frame-shaped sealing material for bonding the first and second substrates together. Thus, e.g., when applying the sealing material in the frame-like shape on the first or second substrate by using a dispenser, lines of the sealing material extend from its corners to form the sealing extension portions, thereby allowing the first substrate and the protrusions of the second substrate to bond together.

The sealing material may be applied in the frame-like shape, and adhesive portions isolated from the sealing material may be provided between the first substrate and the protrusions of the second substrate.

According to the above-described structure, the adhesive portions for bonding the first substrate to the protrusions of the second substrate are isolated from the frame-shaped sealing material for bonding the first and second substrates together. Thus, e.g., after the sealing material is applied in the frame-like shape on the first or second substrate by using a dispenser, the sealing material is applied again to form the adhesive portions, thereby allowing the first substrate and the protrusions of the second substrate to bond together.

Spacers may be provided between the sealing material and the adhesive portions so as to be sandwiched between the first substrate and the protrusions of the second substrate.

According to the above-described structure, the spacer is provided between the sealing material and the adhesive portion. Thus, even if the adhesive portion is isolated from the sealing material, e.g., substrate deflection is reduced when cutting a glass substrate to form the protrusions of the second substrate, thereby cutting the glass substrate at a predetermined position.

End surfaces of the first substrate at edges where the terminal area is not defined, end surfaces of the second substrate at edges corresponding to such edges of the first substrate, and end surfaces of the sealing material may coincide with each other.

According to the above-described embodiment, at the edges of the display panel, at which the terminal area is not defined, the end surfaces of the first substrate, of the second substrate, and of the sealing material coincide with each other, thereby improving end surface strength of the display panel.

The end surfaces of the sealing material may be arranged on an inner side with respect to the end surfaces of the first substrate at edges where the terminal area is not defined, and the end surfaces of the second substrate at edges corresponding to such edges of the first substrate, which coincide with each other; and a resin layer may be provided along the end surfaces of the sealing material arranged on the inner side, so as to fill between the first and second substrates.

According to the above-described structure, at the edges of the display panel, at which the terminal area is not defined, the end surfaces of the sealing material are arranged on the inner side with respect to the end surfaces of the first and second substrates. However, the resin layer is provided along the end surfaces of the sealing material, thereby improving the end surface strength of the display panel.

DETAILED DESCRIPTION

Embodiments of the present disclosure will be described in detail hereinafter with reference to the drawings. In each of the following embodiments, a liquid crystal display panel will be described as an example of display panels, but the present disclosure is not limited to the following embodiments.

Embodiment 1

Figure 1:
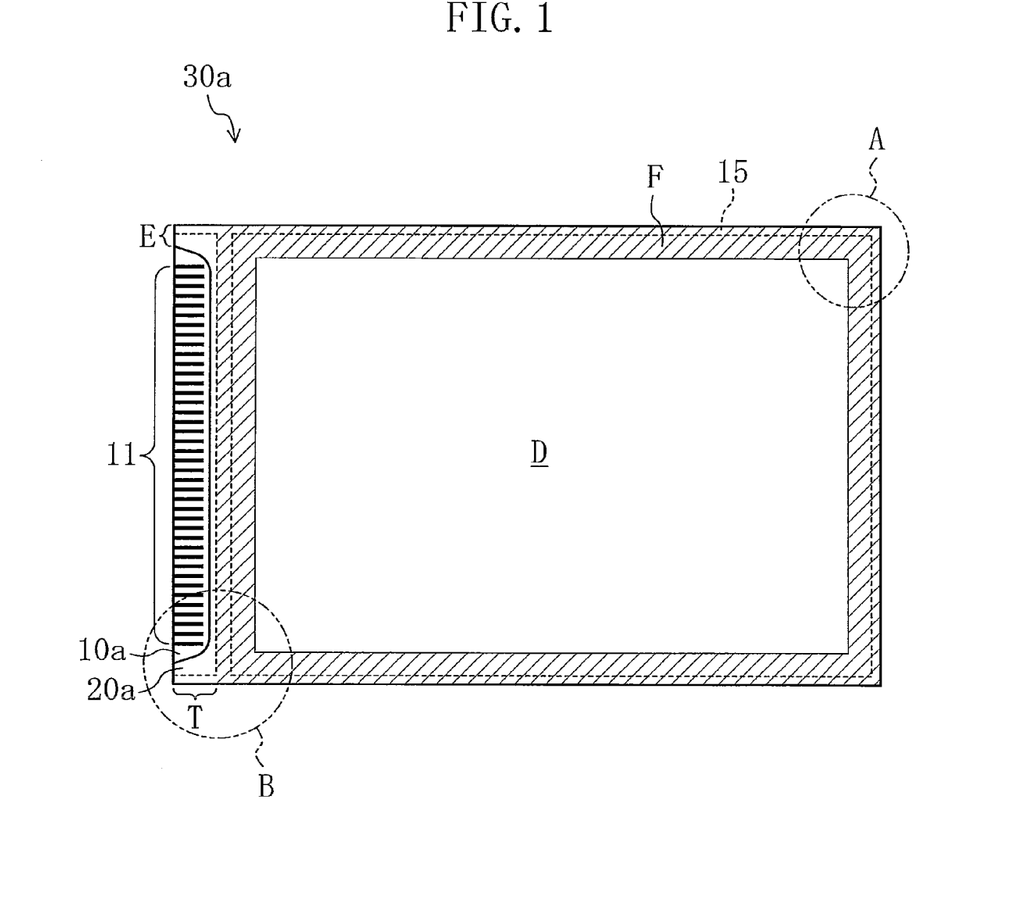
FIG. 1 is a plan view of a liquid crystal display panel of Embodiment 1.
Figure 2:
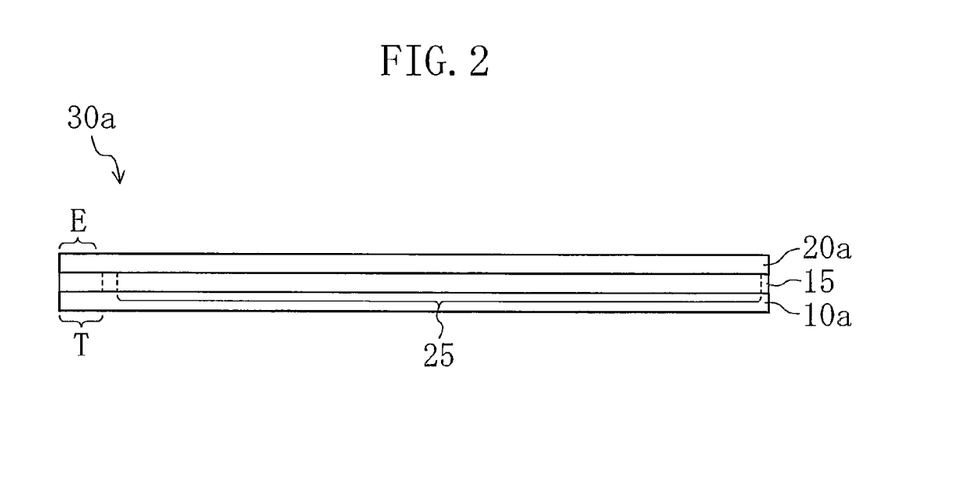
FIG. 2 is a side view of the liquid crystal display panel.
Figure 3:
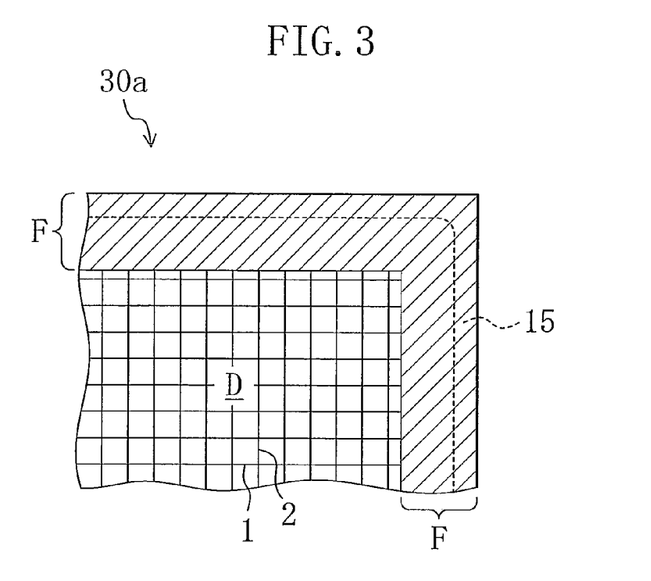
FIG. 3 is an enlarged plan view of an area A of FIG. 1.
Figure 4:
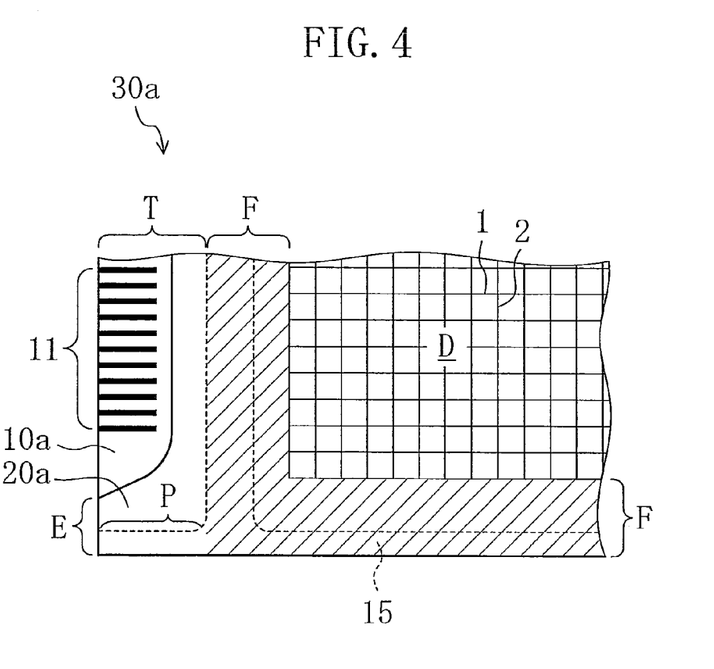
FIG. 4 is an enlarged plan view of an area B of FIG. 1.

FIGS. 1-4 illustrate Embodiment 1 of the display panel of the present disclosure. Specifically, FIG. 1 is a plan view of a liquid crystal display panel 30a of the present embodiment, and FIG. 2 is a side view thereof. In addition, FIG. 3 is an enlarged plan view of an area A of FIG. 1, and FIG. 4 is an enlarged plan view of an area B of FIG. 1.

As illustrated in FIGS. 1 and 2, the liquid crystal display panel 30a includes a rectangular TFT substrate 10a provided as a first substrate; a color filter substrate 20a arranged so as to oppose the TFT substrate 10a, and provided as a second substrate; a liquid crystal layer 25 provided between the both substrates 10a and 20a; and a sealing material 15 for bonding the both substrates 10a and 20a together, and for sealing the liquid crystal layer 25.

As illustrated in FIG. 1, in the liquid crystal display panel 30a, the following areas are defined: a display area D on which an image is displayed; a frame-shaped area F (in the figure, a hatching portion) arranged so as to surround the display area D; and a terminal area T arranged on a left side of the frame-shaped area F. The terminal area T is defined along a left edge of the TFT substrate 10a as viewed in FIG. 1.

As illustrated in FIGS. 3 and 4, in the display area D, the TFT substrate 10a includes a plurality of gate lines 1 provided so as to extend in parallel to each other; a plurality of source lines 2 provided so as to extend in parallel to each other in a direction perpendicular to the gate lines 1; a plurality of TFTs (not shown in the figure), each of which is provided at an intersection of the gate line 1 and the source line 2; and a plurality of pixel electrodes, each of which is provided in an area surrounded by a pair of the adjacent gate lines 1, and by a pair of the adjacent source lines 2.

Each TFT includes, e.g., a gate electrode laterally protruding from the gate line 1; a gate insulating film provided so as to cover the gate electrode; a semiconductor layer provided in an island-like shape at a location corresponding to the gate electrode on the gate insulating film; and source and drain electrodes provided so as to face each other on the semiconductor layer. The source electrode is a portion laterally protruding from the source line 2, and the drain electrode is connected to the pixel electrode through a contact hole which is formed in an interlayer insulating film provided on the drain electrode.

Display lines such as the gate line 1 and the source line 2 extend to the terminal area T through the frame-shaped area F, and are connected to a plurality of connection terminals 11 provided in the terminal area T. Each connection terminal 11 is connected to an external electrical circuit such as gate drivers and source drivers.

The color filter substrate 20a includes a black matrix (not shown in the figure) provided in a frame-like shape in the frame-shaped area F, and in a grid pattern in the display area D; a color filter (not shown in the figure) containing red, green, and blue colored layers, each of which provided between the grids of the black matrix; and a common electrode (not shown in the figure) provided so as to cover the color filter.

As illustrated in FIGS. 1 and 2, the color filter substrate 20a includes approximately-trapezoidal protrusions E protruding to the left edge of the TFT substrate 10a in both end portions at a left edge of the color filter substrate 20a (corresponding to the left edge of the TFT substrate 10a, at which the terminal area T is defined). The protrusions E are arranged so as to overlap with both end portions of the terminal area T of the TFT substrate 10a. As illustrated in FIG. 1, upper, lower, and right edges of the TFT substrate 10a, at which the terminal area T is not defined, coincide with upper, lower, and right edges of the color filter substrate 20a, respectively.

The liquid crystal layer 25 is made of nematic liquid crystal material having an electrooptical property.

As illustrated in FIG. 1, the sealing material 15 is applied in the frame-like shape along an outer circumference of the frame-shaped area F, and includes sealing extension portions P (see FIG. 4) extending from upper and lower left corners of the sealing material 15. The sealing material 15 is made of, e.g., UV/heat curing combined type resin. The sealing extension portions P function as adhesive for bonding the TFT substrate 10a to the protrusions E of the color filter substrate 20a.

The following end surfaces coincide with each other: end surfaces at the upper, lower, and right edges of the TFT substrate 10a, at which the terminal area T is not defined (see FIG. 1); end surfaces at the upper, lower, and right edges of the color filter substrate 20a corresponding the end surfaces of the TFT substrate 10a; and end surfaces at upper, lower, and right edges of the sealing material 15. Consequently, the end surface strength of the liquid crystal display panel can be improved.

In each pixel, which is a minimum unit of an image, of the liquid crystal display panel 30a having the above-described structure, when transmitting a gate signal from the gate line 1 to the gate electrode of the TFT to turn on the TFT, a source signal is transmitted from the source line 2 to the source electrode of the TFT, thereby writing a predetermined charge in the pixel electrode through the semiconductor layer and drain electrode of the TFT. At this point, a potential difference is caused between the pixel electrode of the TFT substrate 10a and the common electrode of the color filter substrate 20a, and then a predetermined voltage is applied to the liquid crystal layer 25. In the liquid crystal display panel 30a, an alignment state of the liquid crystal layer 25 is changed depending on the magnitude of the voltage applied to the liquid crystal layer 25, thereby adjusting a light transmission rate of the liquid crystal layer 25 to display an image.

Next, an example of a method for manufacturing the liquid crystal display panel 30a of the present embodiment will be described. The manufacturing method of the present embodiment includes preparation of a TFT mother substrate; preparation of a color filter mother substrate; application of sealing material; bonding of the mother substrates; and cutting of the bonded body. In the present embodiment, the manufacturing method of the liquid crystal display panel 30a by a so-called "gang printing" in which a plurality of cell units are simultaneously manufactured in rectangular shape will be described as an example.

<Preparation of TFT Mother Substrate>

First, a metal film made of, e.g., aluminum is formed on an entire glass substrate by a sputtering technique. Such a film is patterned by a photolithography technique, thereby forming the gate lines 1 and the gate electrodes in each cell unit.

Subsequently, on the entire substrate on which the gate lines 1 and the gate electrodes are formed, a silicon nitride film, etc. are formed by a CVD (Chemical Vapor Deposition) technique, thereby forming a gate insulating film.

On the entire substrate on which the gate insulating film is formed, an intrinsic amorphous silicon film and a phosphorus-doped n+ amorphous silicon film are successively formed by the CVD technique. Such films are patterned in an island-like shape on the gate electrodes by the photolithography technique, thereby forming a semiconductor-constituting layer including the intrinsic amorphous silicon film and the n+ amorphous silicon film.

On the entire substrate on which the semiconductor-constituting layer is formed, a metal film made of, e.g., titanium is formed by the sputtering technique. Such a film is patterned by the photolithography technique, thereby forming the source lines 2, the source electrodes, and the drain electrodes in each cell unit.

Subsequently, the n+ amorphous silicon film of the semiconductor-constituting layer is etched by using the source and drain electrodes as a mask, and such a film is patterned to provide a channel portion, thereby forming the TFTs having the semiconductor layer in each cell unit.

On the entire substrate on which the TFTs are formed, a film made of, e.g., photosensitive acrylic resin is formed by using a spin coating technique. Such a film is patterned to provide contact holes on the drain electrodes by the photolithography technique, thereby forming an interlayer insulating film in each cell unit.

On the entire substrate on which the interlayer insulating film is formed, an ITO (Indium Tin Oxide) film is formed by the sputtering technique. Such a film is patterned by the photolithography technique, thereby forming pixel electrodes in each cell unit.

Finally, polyimide resin is applied on the substrate, followed by application of a rubbing process. Consequently, an alignment film is formed on the entire substrate on which the pixel electrodes are formed, by a printing technique.

As described above, a TFT mother substrate (10a) including a plurality of cell units can be prepared. In each cell unit, the connection terminals 11 of the terminal area T are formed simultaneously when forming the gate lines 1 and the source lines 2.

Preparation of Color Filter Mother Substrate

First, e.g., a chromium thin film is formed on an entire glass substrate by the sputtering technique. Such a film is patterned by the photolithography technique, thereby forming a black matrix in each cell unit.

Subsequently, photosensitive resist material colored, e.g., red, green, or blue is applied on the substrate. Such material is patterned by the photolithography technique, thereby forming a colored layer having a selected color (e.g., red-colored layer) in portions between the grids of the black matrix. Then, the similar process is repeated for other two colors, thereby forming other colored layers (e.g., green-colored and blue-colored layers). Consequently, a color filter is formed in each cell unit.

On the substrate on which the color filter is formed, e.g., an ITO film is formed by the sputtering technique, thereby forming a common electrode in each cell unit.

Finally, polyimide resin is applied on the substrate, followed by application of the rubbing process. Consequently, an alignment film is formed on the entire substrate on which the common electrodes are formed, by the printing technique.

As described above, a color filter mother substrate (20a) including a plurality of cell units can be prepared.

Application of Sealing Material

As illustrated in FIG. 1, e.g., UV/heat curing combined type resin is applied in an approximately frame-like shape on the color filter mother substrate (20a) prepared in the preparation of the color filter mother substrate, by using an application device such as dispensers, thereby forming the sealing material 15 in each cell unit. Specifically, for example, after the UV/heat curing combined type resin is linearly applied along upper and lower edges (see FIG. 1) of the black matrix formed in each cell unit of the color filter mother substrate (20a), the UV/heat curing combined type resin is linearly applied along left and right edges (see FIG. 1) of the black matrix so as to be perpendicular to the line segment of the UV/heat curing combined type resin applied along the upper and lower edges. The UV/heat curing combined type resin is also applied to areas corresponding to the protrusions E along the upper and lower edges (see FIG. 1) of the black matrix, thereby forming the sealing extension portions P. The sealing material 15 applied along the upper, lower, and right edges (see FIG. 1) of the black matrix may be integrated with sealing material in an adjacent cell unit.

Bonding of Mother Substrates

First, liquid crystal material is dispensed onto portions inside the frames defined by the sealing material 15 of the color filter mother substrate (20a), which is applied to each cell unit in the application of the sealing material.

Subsequently, the color filter mother substrate (20a) onto which the liquid crystal material is dispensed is bonded to the TFT mother substrate (10a) prepared in the preparation of the TFT mother substrate, under reduced pressure such that the cell units of the color filter mother substrate (20a) and of TFT mother substrate (10a) are overlapped with each other. Then, the surfaces of such a bonded body are pressurized by exposing the bonded body to atmospheric pressure.

A UV light is irradiated to the frame-shaped areas F of the bonded body from the TFT mother substrate (10a) side to pre-cure the sealing material, and then the sealing material 15 is post-cured by heating.

Cutting of Bonded Body

First, on the TFT mother substrate (10a) side surface of the bonded body in which the sealing material 15 is cured in the bonding of the mother substrates, a cutting blade rotates and linearly moves with a blade edge of the cutting blade contacting a center position in the width direction of portions at the upper, lower, and right edges of the sealing material 15 (see FIG. 1), and with the blade edge contacting a position along the left edge of the terminal area T (see FIG. 1). This forms a crack in the TFT mother substrate (10a), and the TFT mother substrate (10a) of the bonded body is cut into the cell units by extending the formed crack in the substrate thickness direction.

Subsequently, on the color filter mother substrate (20a) side surface of the bonded body in which the TFT mother substrate (10a) is cut into the cell units, the cutting blade rotates and linearly moves with the blade edge of the cutting blade contacting the center position in the width direction of the portions at the upper, lower, and right edges of the sealing material 15 (see FIG. 1); and the cutting blade rotates and moves so as to outwardly curve along the left edge of the terminal area T of the TFT substrate 10a (see FIG. 1). This forms a crack in the color filter mother substrate (20a), and the color filter mother substrate (20a) of the bonded body is cut into the cell units by extending the formed crack in the substrate thickness direction. Consequently, the entire bonded body is cut into the cell units.

On the color filter substrate 20a side surface formed by cutting the bonded body into the cell units, the cutting blade rotates and moves so as to inwardly curve along the left edge of the terminal area T of the TFT substrate 10a with the blade edge of the cutting blade contacting the color filter substrate 20a. This forms a crack in the color filter substrate 20a, an approximately-trapezoidal portion of the color filter substrate 20a is removed so as to expose a row of the plurality of connection terminals 11 formed in the terminal area T of the TFT substrate 10a as illustrated in FIG. 1. Consequently, protrusions E included in the color filter substrate 20a are formed.

As described above, the liquid crystal display panel 30a of the present embodiment can be manufactured.

As described above, according to the liquid crystal display panel 30a of the present embodiment, the terminal area T including the plurality of connection terminals 11 is defined along the left edge of the TFT substrate 10a. The color filter substrate 20a is bonded to the TFT substrate 10a with the sealing material 15 being interposed therebetween. At the left edge of the color filter substrate 20a corresponding to the left edge of the TFT substrate 10a, at which the terminal area T is defined, the protrusions E are provided, which extend to the left edge of the TFT substrate 10a, at which the terminal area T is defined. Thus, the protrusions E which are a part of the color filter substrate 20a overlap with the terminal area T of the TFT substrate 10a. This improves the strength of the terminal area T in the liquid crystal display panel 30a as compared to the strength if the terminal area T is constituted by only the TFT substrate 110 (see FIGS. 8 and 9), thereby reducing damage in the terminal area T of the liquid crystal display panel 30a.

In addition, according to the liquid crystal display panel 30a of the present embodiment, the protrusions E are arranged in the both end portions of the color filter substrate 20a at the left edge corresponding to the left edge of the TFT substrate 10a, at which the terminal area T is defined. Thus, the protrusions E of the color filter substrate 20a are arranged so as to overlap with the both end portions of the terminal area T of the TFT substrate 10a. Because the damage in the terminal area T of the conventional liquid crystal display panel tends to be caused in the end portions of the terminal area T, the protrusions E of the color filter substrate 20a are arranged so as to overlap with the both end portions of the terminal area T of the TFT substrate 10a, thereby effectively reducing the damage in the terminal area T of the liquid crystal display panel 30a.

Embodiment 2

Figure 5:
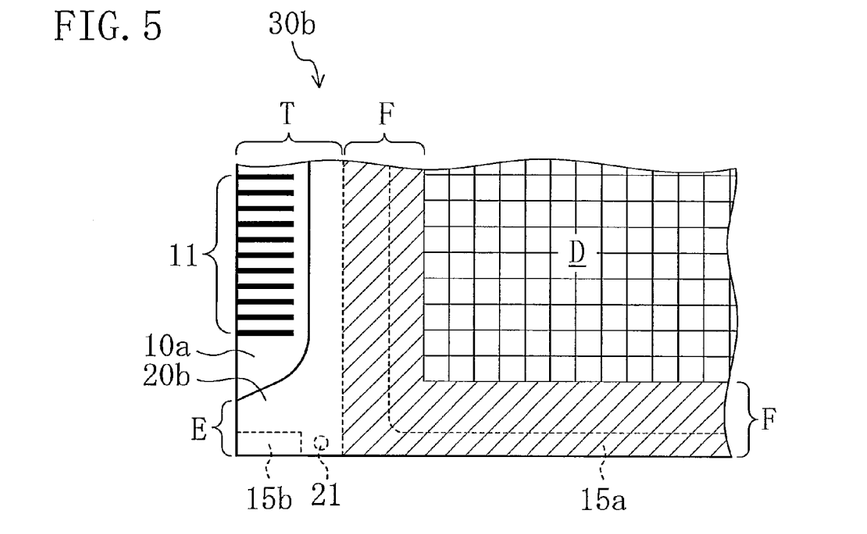
FIG. 5 is a partial plan view of a liquid crystal display panel of Embodiment 2.

FIG. 5 is a plan view of a liquid crystal display panel 30b of the present embodiment. In each of the following embodiments, the same reference numbers as those used in FIGS. 1-4 are used to represent the same elements, and the description thereof will not be repeated.

In Embodiment 1, the TFT substrate 10a and the protrusions E of the color filter substrate 20a are bonded together by the sealing extension portions P extending from the corners of the sealing material 15. However, in the present embodiment, a TFT substrate 10a and protrusions E of a color filter substrate 20b are bonded together by adhesive portions 15b isolated from a sealing material 15a.

As illustrated in FIG. 5, the liquid crystal display panel 30b includes the TFT substrate 10a and the color filter substrate 20b which are arranged so as to oppose to each other; a liquid crystal layer 25 provided between the both substrates 10a and 20b; and the sealing material 15a applied in the frame-like shape in order to bond the both substrates 10a and 20b together, and to seal the liquid crystal layer 25.

As illustrated in FIG. 5, the color filter substrate 20b has a structure in which columnar photo spacers (not shown in the figure) and spacers 21 are formed on the color filter substrate 20a of Embodiment 1.

For example, the photo spacer is provided on each of colored layers so as to protrude from a common electrode to a TFT substrate 10a side.

As illustrated in FIG. 5, the spacer 21 is arranged between the sealing material 15a and the adhesive portion 15b which are applied in application of sealing material, and is made of the same material in the same layer as those of the photo spacer.

Before the alignment film is formed in the preparation of the color filter mother substrate of Embodiment 1, a film made of, e.g., photosensitive acrylic resin is formed on the common electrode by, e.g., the spin coating technique, followed by patterning such a film by the photolithography technique. Consequently, the photo spacers and the spacers 21 are formed in each cell unit, thereby preparing the color filter substrate 20b (color filter mother substrate) having the above-described structure.

When UV/heat curing combined type resin is applied on the prepared color filter mother substrate (20b) by using an application device such as dispensers in the application of the sealing material of Embodiment 1, the UV/heat curing combined type resin is applied in the frame-like shape along upper, lower, left, and right edges of a black matrix formed in each cell unit of the color filter mother substrate (20b), thereby forming the sealing material 15a. Subsequently, the UV/heat curing combined type resin is applied on the substrate again, thereby forming the adhesive portion 15b so as to isolate the adhesive portion 15b from the sealing material 15a. Consequently, the liquid crystal display panel 30b having the above-described structure can be manufactured.

According to the liquid crystal display panel 30b of the present embodiment, the spacer 21 is provided between the sealing material 15a and the adhesive portion 15b. Thus, even if the adhesive portion 15b is isolated from the sealing material 15a, e.g., substrate deflection is reduced when cutting the substrate to form the protrusions E of the color filter substrate 20b in the cutting of the bonded body, thereby cutting the substrate at a predetermined position.

Embodiment 3

Figure 6:
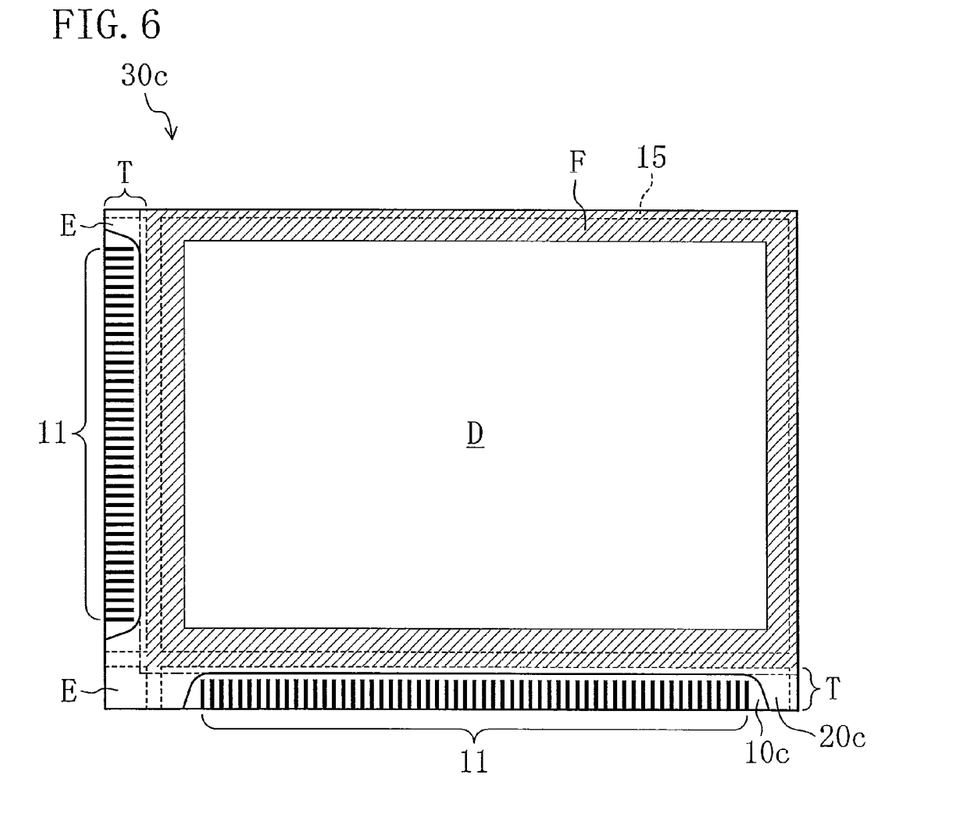
FIG. 6 is a plan view of a liquid crystal display panel of Embodiment 3.

FIG. 6 is a plan view of a liquid crystal display panel 30c of the present embodiment.

In the above-described embodiments, one terminal area T is defined along one edge of the TFT substrate 10a. However, in the present embodiment, two terminal areas T are defined along two edges of a TFT substrate 10c.

The liquid crystal display panel 30c includes the TFT substrate 10c and a color filter substrate 20c which are arranged so as to opposed to each other; a liquid crystal layer 25 provided between the both substrates 10c and 20c; and a sealing material 15 applied in the frame-like shape in order to bond the both substrates 10c and 20c together, and to seal the liquid crystal layer 25.

As illustrated in FIG. 6, the TFT substrate 10c has the structure similar to that of the TFT substrate 10a of Embodiment 1, except that the terminal areas T are defined along left and lower edges of the TFT substrate 10c. The pattern shape when forming the connection terminals 11 in the preparation of the TFT mother substrate of Embodiment 1 is changed, thereby preparing the TFT substrate 10c.

As illustrated in FIG. 6, the color filter substrate 20c has the structure similar to that of the color filter substrate 20a of Embodiment 1, except that upper left, lower left, and lower right portions of the color filter substrate 20c include protrusions E. The shape of the substrate removed in the cutting of the bonded body of Embodiment 1 is changed, thereby preparing the color filter substrate 20c.

According to the liquid crystal display panel 30c of the present embodiment, the terminal areas T including the plurality of connection terminals 11 are defined along the left and lower edges of the TFT substrate 10c. The color filter substrate 20c is bonded to the TFT substrate 10c with the sealing material 15 being interposed therebetween. At the edges of the color filter substrate 20c corresponding to the left and lower edges of the TFT substrate 10c, at which the terminal areas T are defined, the protrusions E are provided, which extend to the left and lower edges of the TFT substrate 10c, at which the terminal areas T are defined. Thus, the protrusions E which are a part of the color filter substrate 20c overlap with the terminal areas T of the TFT substrate 10c. This improves the strength of the terminal areas T in the liquid crystal display panel 30c as compared to the strength if the terminal areas T are constituted by only the TFT substrate, thereby reducing the damage in the terminal areas T of the liquid crystal display panel 30c.

Embodiment 4

Figure 7:
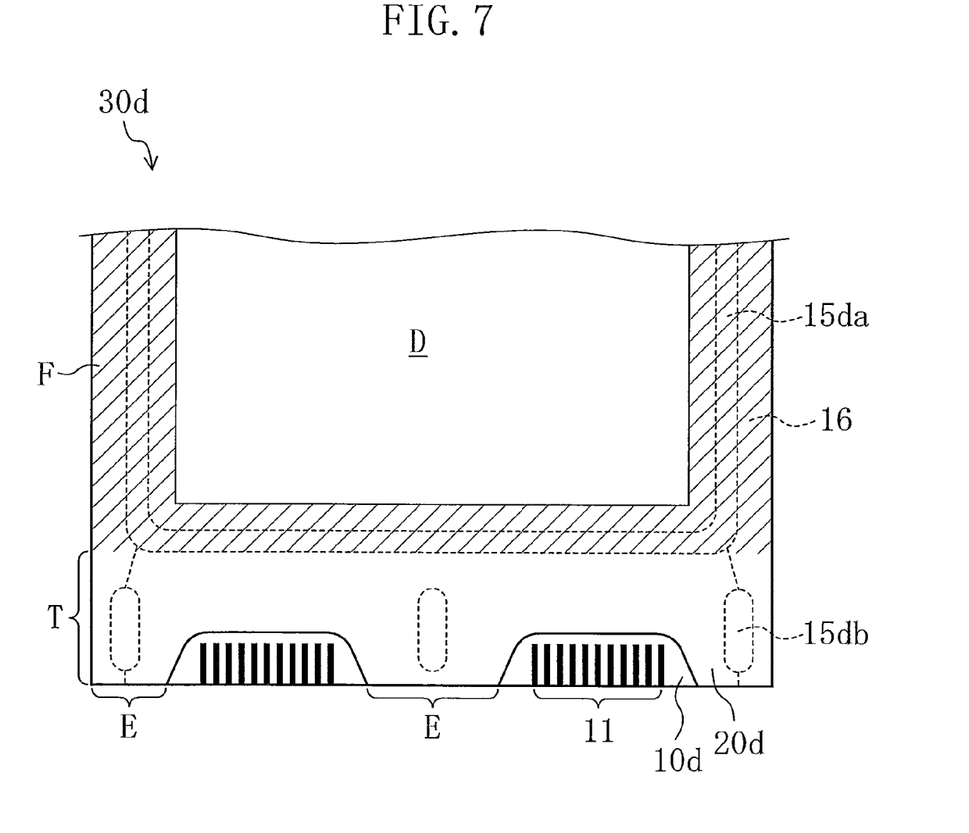
FIG. 7 is a partial plan view of a liquid crystal display panel of Embodiment 4.

FIG. 7 is a plan view of a liquid crystal display panel 30d of the present embodiment.

In the above-described embodiments, one terminal area T is defined along one edge of the TFT substrate 10a. However, in the present embodiment, two terminal areas T are defined along one edge of a TFT substrate 10d.

The liquid crystal display panel 30d includes the TFT substrate 10d and a color filter substrate 20d which are arranged so as to opposed to each other; a liquid crystal layer 25 provided between the both substrates 10d and 20d; and a sealing material 15da applied in the frame-like shape in order to bond the both substrates 10d and 20d together, and to seal the liquid crystal layer 25.

As illustrated in FIG. 7, the TFT substrate 10d has the structure similar to that of the TFT substrate 10a of Embodiment 1, except that two terminal areas T are defined along a lower edge of the TFT substrate 10d. The pattern shape when forming the connection terminals 11 in the preparation of the TFT mother substrate of Embodiment 1 is changed, thereby preparing the TFT substrate 10d.

As illustrated in FIG. 7, the color filter substrate 20d has the structure similar to that of the color filter substrate 20a of Embodiment 1, except that lower left, lower middle, and lower right portions of the color filter substrate 20d include protrusions E. The shape of the substrate removed in the cutting of the bonded body of Embodiment 1 is changed, thereby preparing the color filter substrate 20d.

The edges of the TFT substrate 10d, at which the terminal areas T are not defined, coincide with the corresponding edges of the color filter substrate 20d, and end surfaces of the sealing material 15da are arranged on an inner side with respect to end surfaces at such coincided edges. A resin layer 16 is provided along the end surfaces of the sealing material 15da so as to be filled between the TFT substrate 10d and the color filter substrate 20d.

Adhesive portions 15db are provided between the TFT substrate 10d and the protrusions E of the color filter substrate 20d so as to be isolated from the sealing material 15da.

When the UV/heat curing combined type resin is applied on the prepared color filter mother substrate (20d) by using an application device such as dispensers in the application of the sealing material of Embodiment 1, the UV/heat curing combined type resin is applied in the frame-like shape along upper, lower, left, and right edges of black matrices formed in cell units of the color filter mother substrate (20d) to form the sealing material 15da, followed by forming the adhesive portion 15db so as to isolate the adhesive portion 15db from the sealing material 15da by applying the UV/heat curing combined type resin again. In addition, after spaces between the end surfaces of the TFT substrate 10d and of the color filter substrate 20d at three edges of the liquid crystal display panel in which the protrusions E are formed in the cutting of the bonded body of Embodiment 1 are filled with UV curing resin, such resin is cured to form the resin layer 16, thereby manufacturing the liquid crystal display panel 30d having the above-described structure.

According to the liquid crystal display panel 30d of the present embodiment, although the end surfaces of the sealing material 15da are arranged on the inner side with respect to the end surfaces of the TFT substrate 10d and of the color filter substrate 20d at the edges where the terminal areas T are not defined, the resin layer 16 is provided along the end surfaces of the sealing material 15da, thereby improving the strength of the end surfaces.

As described above, since the strength of the display panel can be improved, the present disclosure is useful for all types of liquid crystal display panels including, e.g., compact mobile liquid crystal display panels and large-size liquid crystal display panels used in liquid crystal televisions.

What is claimed is:

1. A display panel, comprising:
   a first substrate in which a terminal area is defined along at least one edge thereof, and connection terminals are formed in the terminal area; and
   a second substrate which is bonded to the first substrate with sealing material being interposed between the first and second substrates, so as to expose the connection terminals,
   wherein, at an edge of the second substrate corresponding to the edge of the first substrate, at which the terminal area is defined, the second substrate includes protrusions protruding to the edge of the first substrate.

2. The display panel of claim 1, wherein
   the sealing material is applied in a frame-like shape; and
   a liquid crystal layer sealed by the sealing material is provided between the first and second substrates.

3. The display panel of claim 1, wherein
   the protrusions are provided in both end portions of the second substrate at the edge corresponding to the edge of the first substrate, at which the terminal area is defined.

4. The display panel of claim 1, wherein
   the sealing material is applied in the frame-like shape; and
   sealing extension portions extending from corners of the sealing material are provided between the first substrate and the protrusions of the second substrate.

5. The display panel of claim 1, wherein
   the sealing material is applied in the frame-like shape; and
   adhesive portions isolated from the sealing material are provided between the first substrate and the protrusions of the second substrate.

6. The display panel of claim 5, wherein
   spacers are provided between the sealing material and the adhesive portions so as to be sandwiched between the first substrate and the protrusions of the second substrate.

7. The display panel of claim 1, wherein
   end surfaces of the first substrate at edges where the terminal area is not defined, end surfaces of the second substrate at edges corresponding to such edges of the first substrate, and end surfaces of the sealing material coincide with each other.

8. The display panel of claim 1, wherein
   the end surfaces of the sealing material are arranged on an inner side with respect to the end surfaces of the first substrate at edges where the terminal area is not defined, and the end surfaces of the second substrate at edges corresponding to such edges of the first substrate, which coincide with each other; and
   a resin layer is provided along the end surfaces of the sealing material arranged on the inner side, so as to fill between the first and second substrates.

* * * * *